United States Patent [19]

Kurcbart et al.

[11] Patent Number: 4,654,631

[45] Date of Patent: Mar. 31, 1987

[54] POCKET CLIP WITH INTEGRAL DISPLAY

[75] Inventors: Roberto Kurcbart, Boca Raton; William J. Scheid, Coral Springs, both of Fla.

[73] Assignee: Motorola, Inc., Schaumburg, Ill.

[21] Appl. No.: 816,583

[22] Filed: Mar. 6, 1986

[51] Int. Cl.⁴ .............................................. H04Q 1/30

[52] U.S. Cl. .................................. 340/311.1; 24/3 L; 224/269

[58] Field of Search ........... 340/311.1, 825.44, 825.46, 340/407; 16/223, DIG. 40; 24/3 J, 3 L, 499, 532; 224/269, 230; 455/348, 349, 344; 361/399

[56] References Cited

U.S. PATENT DOCUMENTS

| | | | |
|---|---|---|---|
| 3,668,528 | 6/1972 | Hutchinson et al. | 340/311.1 |
| 3,693,089 | 9/1972 | Hutchinson et al. | 340/311.1 |
| 3,956,701 | 5/1976 | James et al. | 340/825.44 |
| 4,031,468 | 6/1977 | Ziebell et al. | 343/702 |
| 4,313,119 | 1/1982 | Garay et al. | 343/724 |
| 4,536,925 | 8/1985 | Boothe et al. | 455/351 |
| 4,578,739 | 3/1986 | McKee et al. | 361/395 |

*Primary Examiner*—John W. Caldwell, Sr.
*Assistant Examiner*—David A. Okonsky
*Attorney, Agent, or Firm*—Martin J. McKinley; Daniel K. Nichols; Joseph T. Downey

[57] ABSTRACT

A pocket clip suitable for attaching a personal paging receiver to an article of clothing has an integral character display. The pocket clip has a rigid lower housing part, and a plastic upper housing part containing the display and a circuit board with display decoder/driver circuitry. A conductive elastomer electrically connects the circuit board to the display while a flex circuit connects the circuit board to the paper. Bayonet tabs on the lower housing mate with slots in the upper housing to slideably connect the upper and lower housing parts. In one embodiment, the pressure necessary to clamp an article of clothing between the pocket clip and the pager is generated by a pawl, pivotally attached to the clip, with compressed springs positioned between the pawl and the clip. In another embodiment, the clamping pressure is generated by a torsion spring. An optional integral switch is also described. The switch button, or a plastic cap, provide an interference fit such that when installed the upper housing part cannot be slideably detached from the lower housing part.

28 Claims, 8 Drawing Figures

POCKET CLIP WITH INTEGRAL DISPLAY

BACKGROUND OF THE INVENTION

This invention relates to the field of data display modules and more particularly to an integral pocket clip and character display module that finds application in selective call personal paging receivers.

Selective call personal paging receivers ("pagers") can be categorized according to the method they use to convey a transmitted message to the user of the pager. "Tone only" pagers simply emit a short audible "alert tone" to inform the user that he or she has a message, but do not actually convey the message to the user. After hearing the alert tone, the user typically calls a prearranged telephone number to receive the actual message. "Tone and voice" pagers include the necessary audio circuits and a small speaker to permit the user to hear a verbal message following the alert tone. "Display" pagers include a small alphanumeric character display whereby a short message, such as a telephone number, may be displayed. One advantage of display pagers is that they convey the message silently, maintaining the user's message in confidence.

Recently developed paging systems transmit information from a base station to a paging receiver digitally. In a tone only system, a particular paging receiver is alerted by transmitting the pager's unique address code. In a display pager system, a message is sent to a particular paging receiver by transmitting the pager's unique address code followed by the message. A display pager uses the same basic circuits as a digital tone only pager, but additionally includes a display, display decoder circuitry, and circuitry or software to decode the message. Accordingly, to produce a display pager it is advantageous for a manufacturer to make a display module that attaches to its more basic line of tone only pagers. Therefore, by adding a display module with display decoder circuitry plus additional software or hardware to decode the message, the tone only pager can be upgraded to a display pager. This approach saves both development and manufacturing costs, and permits the manufacturer to introduce a display pager into its product line that is based on a proven product.

In the design of personal paging receivers, the trend has been towards reducing their overall size. With present technology, personal paging receivers are available that are sufficiently small and slim to fit into the user's shirt, blouse, or slacks pocket. Although a basic tone only "pocket" pager could be converted to a display pager by attaching a display module to the pager, this would undesirably increase the bulk of the pager in the user's pocket. Since pocket pagers typically have a pocket clip that holds the pager in the pocket by clamping the outer pocket material between the pager housing and the clip, it would be advantageous for the pager to have a display module built into the pocket clip, such that the additional bulk required for the display and decoder circuitry is added externally to the pocket.

Placing a display and decoder circuitry in the pocket clip, however, presents several problems. To begin, most displays are easily damaged by bending or twisting, therefore, the pocket clip housing must be sufficiently rigid to resist any deforming stresses, which are usually most severe during attachment and detachment of the pager to and from the pocket. The weight of the pocket pager, and consequently the weight of the pocket clip, is also important. Any additional weight increases the user's discomfort, especially when worn in a shirt or blouse pocket.

Creating the clamping pressure is also a problem when the display is included in the pocket clip. Because most displays are damaged by bending, the pocket clip cannot be constructed of flexible and resilient materials such that the clamping pressure is inherent in the clip itself. The display also increases the length of the pocket clip, especially where a large number of characters are displayed. If the clip were to be pivotally attached to the pager housing at the upper end of the clip, and a spring were positioned near the pivot point between the housing and the clip, well known principles of mechanics dictate that to maintain the same clamping pressure the spring tension must be increased proportionally with the length of the clip. Because of the space and weight requirements of pocket pagers, it is difficult to design a spring that can generate sufficient clamping force at the lower end of a long display pocket clip.

SUMMARY OF THE INVENTION

Accordingly, an object of the invention is to provide an improved display module.

Another object of the invention is to provide an integral display and pocket clip module that is small in size, light in weight, and resists bending or flexing.

Another object of the invention is to provide an integral display and pocket clip module, suitable for attachment to a personal paging receiver, that has sufficient clamping force to secure the paging receiver in a user's pocket.

Still another object of the invention is to provide an integral display and pocket clip module that contains display decoder circuitry and can be assembled without the use of tools.

Briefly, in one embodiment of the invention a personal display pager, suitable for attachment to an article of clothing, includes a housing with a receiver located in the housing for receiving information transmitted to the pager. A clip is attached to the housing and the clip has a clamping means for removably attaching the pager to the article of clothing by clamping the article between the housing and the clip. A message display is located in the clip to visually display messages that correspond to the information transmitted to the pager. Means for electrically connecting the message display to the receiver are also included.

In another embodiment, a display pocket clip, suitable for removably attaching a main housing to a personal article, includes a clip housing with a message display located in the clip housing. A circuit substrate having display decoder/driver circuitry is also located in the clip housing and the substrate is connected to the message display by a first electrical interconnecting means. The clip is attached to the main housing with an attaching means and the circuit substrate is electrically connected to the main housing circuits by a second electrical interconnecting means. Clamping means is also included for clamping the personal article when it is inserted between the main housing and the clip housing.

In still another embodiment, a display pocket clip, suitable for removably attaching a main housing to a personal article, includes a clip housing having first and second ends and a message display located in the clip housing. A circuit substrate having display decoder/driver circuitry is also located in the clip housing and the substrate is connected to the message display by a first electrical interconnecting means. The clip is pivotally attached to the main housing with pivotal attaching means and the circuit substrate is electrically connected to the main housing circuits by a second electrical interconnecting means. Clamping means is also included for generating a clamping pressure between the main housing and the clip housing at the second end of the clip housing.

DESCRIPTION OF THE PREFERRED EMBODIMENT

Figure 1:
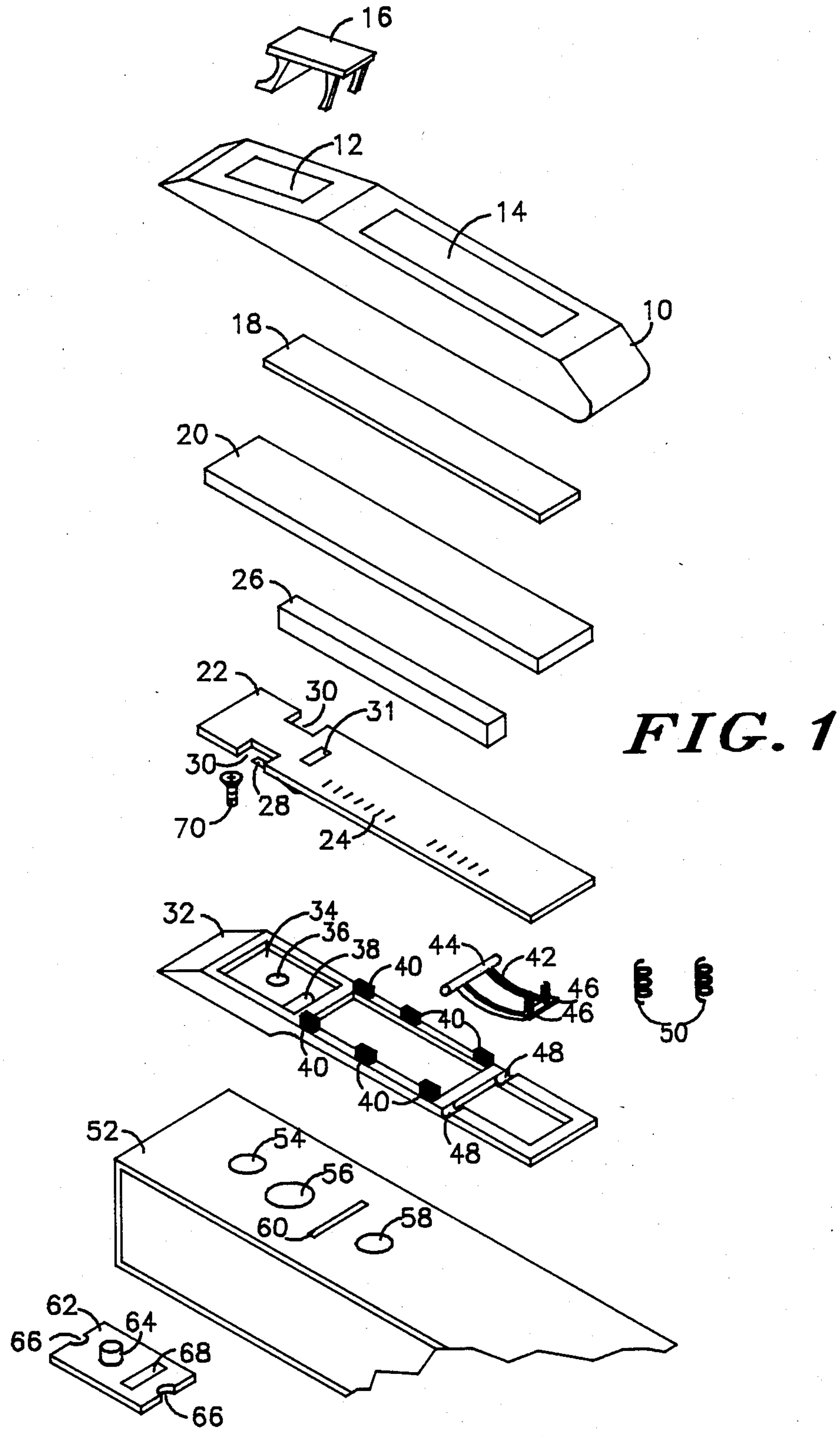
FIG. 1 is an exploded perspective view of the present invention illustrating an optional integral switch.

In FIG. 1, an exploded view of an integral display and pocket clip illustrates one embodiment of the invention having an optional integral switch. An upper pocket clip housing 10, preferably constructed from ABS plastic, has apertures 12 and 14 and a switch button 16. Switch button 16, which is also preferably constructed from ABS plastic, is positioned in aperture 12 and described below in greater detail in connection with FIG. 4. A transparent flat lens 18, slightly larger than aperture 14 and preferably constructed from a polycarbonate sheet, is positioned under aperture 14. A message display 20, preferably a liquid crystal display having appropriate polarizers and light reflectors, is positioned below lens 18. A circuit substrate 22, preferably a polyimide printed circuit board, contains display decoder/driver circuitry (not illustrated) and a row of electrical contacts 24, preferably gold plated, to couple the appropriate electrical signals to display 20. A conductive elastomer 26 provides an electrical interconnecting means between contacts 24 of circuit substrate 22 and electrical contacts (not illustrated) on the lower side of display 20. Liquid crystal displays with polarizers and reflectors, display decoder/driver circuitry, and conductive elastomers are well known in the art. Circuit substrate 22 has two electrical switch contacts 28 (only one is visible in FIG. 1) fixed to the lower side of substrate 22 and positioned over two notches 30 in the substrate.

A lower pocket clip housing part 32, preferably constructed from die cast aluminum, is positioned beneath circuit substrate 22. Lower housing 32 has a recessed portion 34 which has a substantially circular hole 36 and an elongated slot 38. Lower housing 32 also has six bayonet-type interlocking tabs 40 which mate with six compound slots 41 (not illustrated in FIG. 1) in upper housing 10, both of which are described below in more detail in connection with FIGS. 6 and 7. Lower housing 32 provides a rigid support for the integral display and pocket clip, thereby preventing any damage to display 20 caused by bending or twisting.

A pawl 42, preferably constructed from ABS plastic, having a shaft 44 and two pins 46 is positioned between lower housing 32 and circuit substrate 22. Pawl 42 is pivotally attached to lower housing 32 by inserting shaft 44 into seats 48 of lower housing 32. Two coil springs 50 are positioned over pins 46. The operation of pawl 42 and springs 50 will be described below in connection with FIG. 2.

A pager housing 52, or other housing to which the display pocket clip is to be attached, is positioned beneath lower pocket clip housing part 32. Pager housing 52 preferably contains a well known selective call personal paging radio receiver (not illustrated) for receiving transmitted information, although circuitry for performing other functions can also be placed in housing 52. Pager housing 52 has holes 54, 56, and 58 wherein hole 56 is in alignment with hole 36 of lower pocket clip housing part 32. Pager housing 52 also has a slot 60 in alignment with slot 38 of lower pocket clip housing part 32. A nut 62 having a threaded collar 64 is positioned below the upper side of pager housing 52 with collar 64 protruding through hole 56. Nut 62 has two semi-circular indentations 66 which align with holes 54 and 58 of pager housing 52. Nut 62 also has a slot 68 which is in alignment with slot 60 of pager housing 52 and slot 38 of lower pocket clip housing part 32. Nut 62 is preferably a stamped part. A flat head screw 70, preferably made from stainless steel, protrudes through hole 36 and is threaded into collar 64 of nut 62, thereby securing lower pocket clip housing part 32 to pager housing 52.

Figure 2:
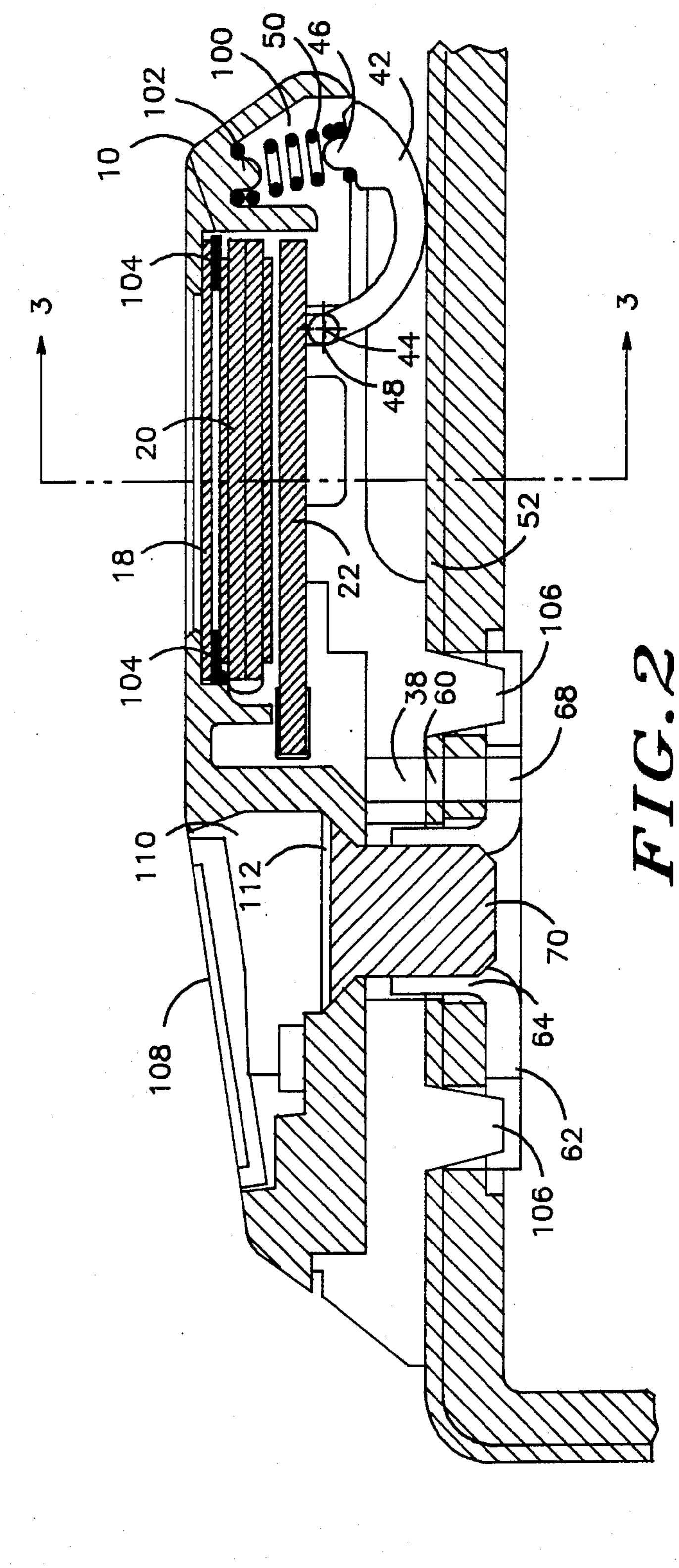
FIG. 2 is a longitudinal sectional view of the invention without the optional integral switch.

FIG. 2 is a longitudinal sectional view of the integral display and pocket clip without the optional integral switch. Upper pocket clip housing 10 has a cavity 100 which has a pair of pins 102 wherein each pin 102 anchors one of two coil springs 50 (only one pin 102 and one coil spring 50 are visible in FIG. 2). In FIG. 2 shaft 44 of pawl 42 is shown assembled in seat 48 of lower pocket clip housing part 32. Also, coil springs 50 are shown assembled on pins 46 of pawl 42 and pins 102 of upper pocket clip housing part 10. In operation, an article of clothing, preferably the outer material of a pocket, is inserted between pawl 42 and pager housing 52. The thickness of this material causes pawl 42 to pivot around axis 44, thereby further compressing springs 50. Thus, pawl 42, springs 50, and pins 102 and 46 provide a clamping means for providing a clamping pressure between the display pocket clip and pager housing 52. Although a pair of springs 50 is preferred, one spring is adequate.

Resilient material 104, preferably a foam rubber, is positioned between lens 18 and display 20 to hold lens 18 in position and provide shock isolation for the display. Two protuberances 106 projecting from the bottom of lower housing 32 protrude through holes 54 and 58 in pager housing 52, thereby preventing any rotation of the integral display and pocket clip around screw 70.

In the embodiment without the integral switch, a plastic cap 108 covers an attachment screw cavity 110. In this embodiment, upper housing 10 has a hole 112 in alignment with collar 64 of nut 62 through which screw 70 is inserted. Thus, both upper and lower housing parts 10 and 32 are secured to pager housing 52 by screw 70 in this embodiment. A well known flex circuit (not illustrated) provides a means for electrically interconnecting circuit substrate 22 with the circuits of pager 52 through slots 38, 60, and 68.

Figure 3:
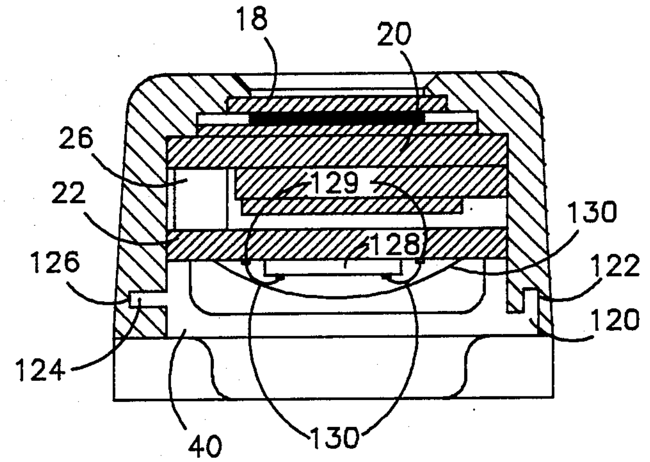
FIG. 3 is a cross-sectional view of the invention along line 3—3 of FIG. 2.

FIG. 3 is a cross-sectional view of the display pocket clip. Each bayonet interlocking tab 40 has a vertical tab 120 which fits into a recessed slot 122 in upper pocket clip housing part 10. Each bayonet interlocking tab 40 also has a horizontal tab 124 that fits into a recessed slot 126 in upper pocket clip housing part 10. Bayonet tabs 40 are described in greater detail in connection with FIGS. 5 and 6. Circuit substrate 22 also has an integrated circuit die 128 attached to its lower surface. Die 128 is connected to pads 129 on circuit substrate 22 preferably through wire bonds 130, although other well known methods of connecting a die to a substrate, such as soldered chip carriers, are suitable.

Figure 4:
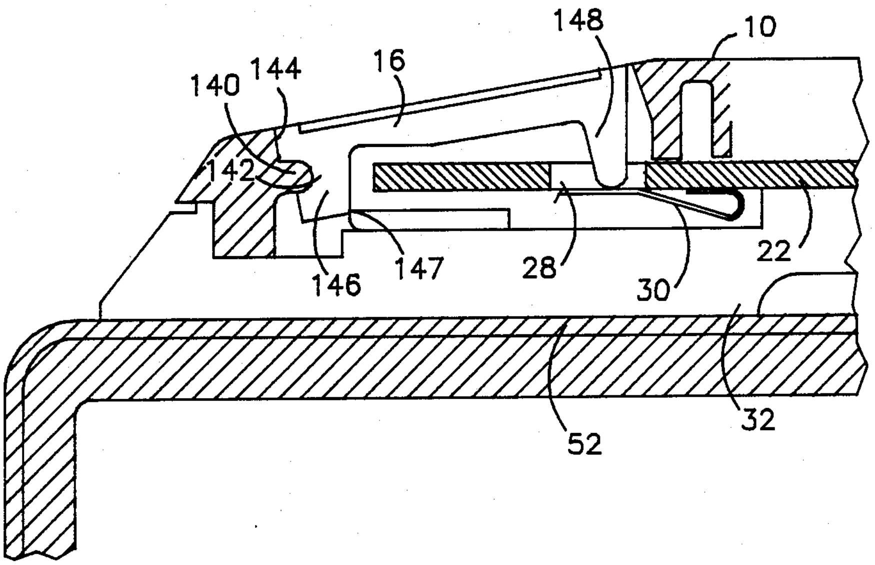
FIG. 4 is a longitudinal sectional view of the invention illustrating in detail the optional integral switch.

FIG. 4 is a cross-sectional view of the upper portion of the display pocket clip illustrating the optional integral switch, shown in its undepressed or unactuated position. When the integral display and pocket clip is attached to a personal paging receiver, the integral switch can be used to recall messages stored in the pager's memory. Upper pocket clip housing part 10 has a hinge pin 140 that mates with seat 142 of switch button 16. Hinge pin 140 and seat 142 provide for pivotal mounting of switch button 16. The upper end of switch button 16 contacts upper housing 10 at 144, thereby limiting the rotation of the switch button in its undepressed position. Seat 142 of switch button 16 has a widened portion 146 that provides for a snap fit between hinge pin 140 and circuit substrate 22. When switch button 16 is installed in the pocket clip housing, widened portion 146 contacts lower housing part 32 at 147, thereby preventing upper housing part 10 from being slideably detached from lower housing part 32. Switch button 16 also has two protuberances 148 which rest on switch contacts 30. When switch button 16 is depressed or actuated, protuberances 148 push on switch contacts 30 causing them to bend until they contact lower metal housing part 32, thereby grounding switch contacts 30. Thus, it can be seen that lower pocket clip housing part 32 forms a second set of electrical contacts that mate with switch contacts 30 when switch button 16 is depressed.

Figure 5:
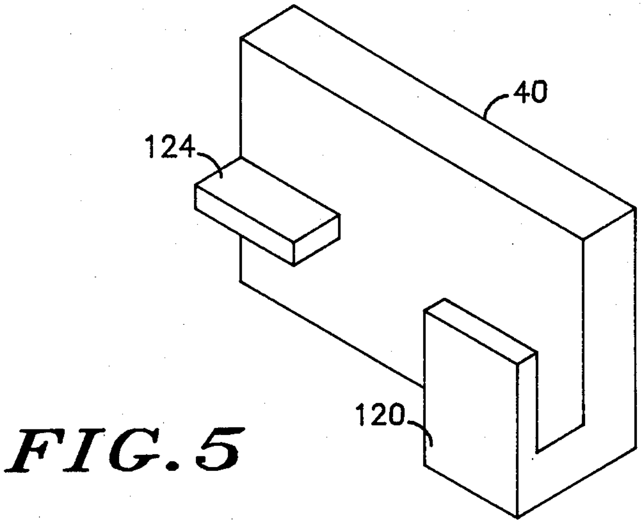
FIG. 5 is a detailed perspective view of interlocking tabs 40 which are used to connect the upper and lower pocket clip housing parts.
Figure 6:
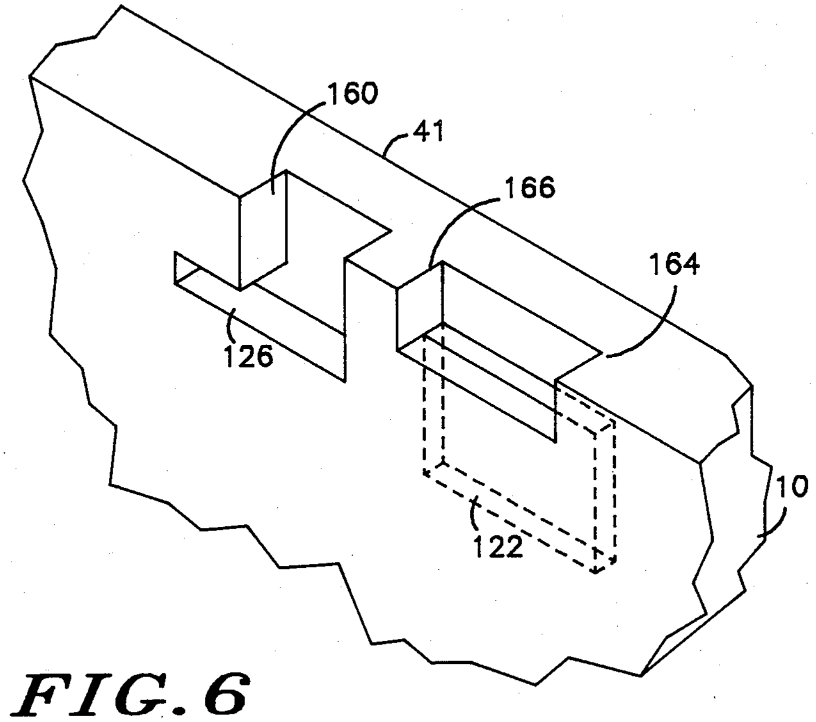
FIG. 6 is a detailed perspective view of interlocking slots 41 which mate with interlocking tabs 40 of FIG. 5.

FIG. 5 is a detailed perspective view of a typical bayonet tab 40 while FIG. 6 is a detailed perspective view of a typical compound slot 41 of upper housing 10 that mates with bayonet tab 40. Typical bayonet tab 40 has a horizontal tab 124 and a vertical tab 120 spaced slightly from the main body of bayonet tab 40. When upper housing 10 is first assembled onto lower housing 32, each horizontal tab 124 slides into slot 160 of upper housing 10 and vertical tab 120 slides into pocket 122 near end 164. Then, by sliding upper housing 10, vertical tab 122 moves towards end 166 of pocket 122 and horizontal tab 124 slides into slot 126. When horizontal tab 124 is installed in slot 126, upper housing 10 is secured to lower housing 32, and vertical tabs 120 and pocket 122 prevent lateral deformation of the walls of upper housing part 10. Thus, bayonet tabs 40 and compound slots 41 provide a means for interconnecting upper housing part 10 with lower housing part 32. Although tabs 40 and slots 41 are preferred, other well known devices for interconnecting housing parts are also suitable.

Figure 7:
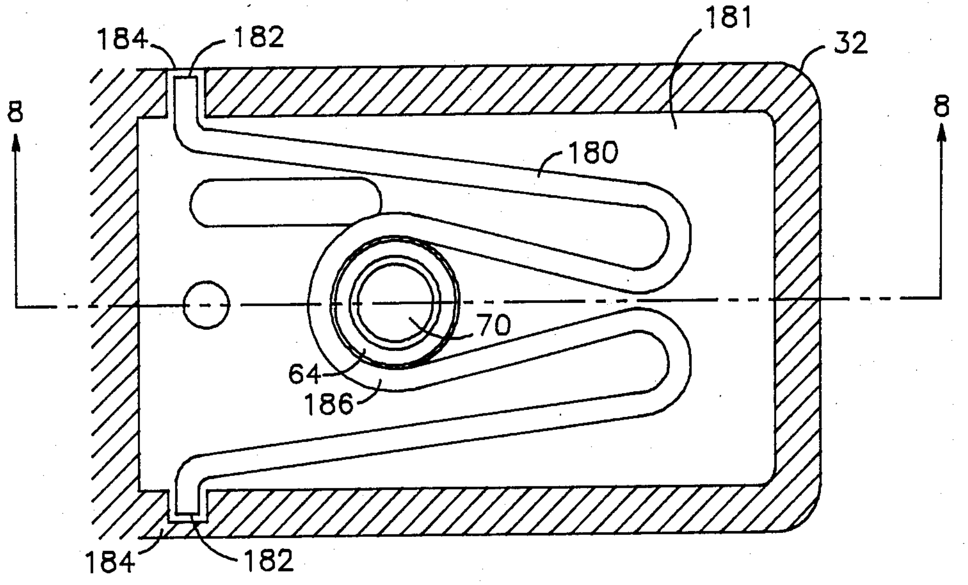
FIG. 7 is a sectional top view of the upper end of the display pocket clip illustrating an alternate embodiment of the invention that uses a torsion spring to generate the clamping tension.
Figure 8:
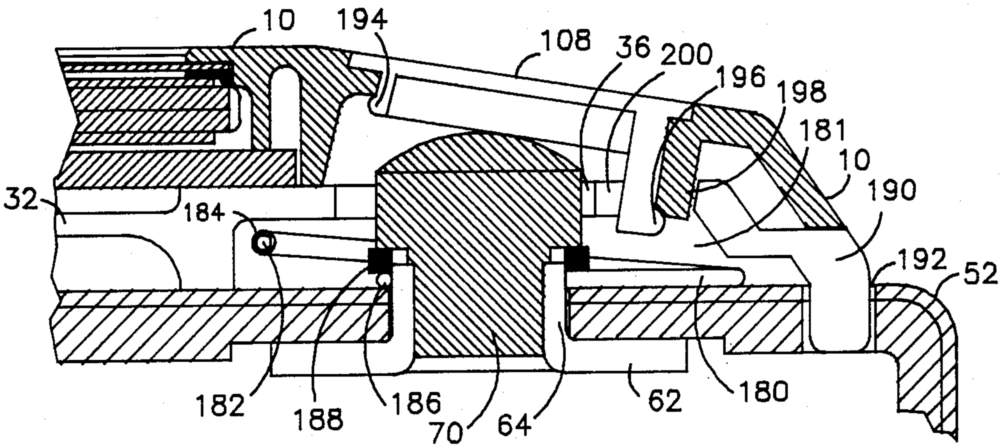
FIG. 8 is a longitudinal sectional view of the torsion spring embodiment as seen along line 8—8 of FIG. 7.

FIGS. 7 and 8 illustrate an alternate embodiment of the integral display and pocket clip in which the clamping pressure is generated by means of a torsion spring. In the first embodiment, illustrated in FIGS. 1 and 2, the pocket clip is fixed relative to pager housing 52 and the clamping pressure is generated at the lower end of the clip by pawl 42 and springs 50. In the alternate embodiment, illustrated in FIGS. 7 and 8, the pocket clip pivots at its upper end relative to pager housing 52 and the clamping pressure is generated by a torsion spring, which forcibly rotates the lower end of the pocket clip into the pager housing.

In FIG. 7, a sectional top view through the upper end of lower housing 32, torsion spring 180 is preferably constructed from stainless steel or music wire and is positioned in recessed area 181 of lower housing 32. Ends 182 of torsion spring 180 are positioned in slots 184 in the side walls of recessed area 181. Torsion spring 180 has a central loop portion 186 that surrounds collar 64 of retaining nut 62. Ends 182 of torsion spring 180 provide attachment points to attach the spring to the clip housing, while loop 186 provides another attachment point to attach the spring to pager housing 52.

FIG. 8 is a longitudinal cross sectional view of the upper end of the torsion spring embodiment of the display pocket clip. A washer 188, positioned over loop 186 of torsion spring 180, and screw 70 secure the torsion spring to the upper surface of pager housing 52. In FIG. 8, it can be seen that holes 184 are positioned above the upper surface of pager housing 52 such that a clamping pressure is generated by torsion spring 180 even when the pocket clip is not attached to an article of clothing. An elongated pin 190 at the upper end of lower housing 32 is inserted into an elongated slot 192 at the upper end of pager housing 52. In this embodiment, pin 190 and slot 192 provide a pivotal attaching means for pivotally attaching the integral display and pocket clip to pager housing 52. Hole 36 for screw 70 is larger in diameter than in previously described embodiments so that the head of screw 70 and washer 188 fit through hole 36. Cap 108, preferably constructed from ABS plastic, has tabs 194 and 196 that snap into position around upper housing 10. Tab 196 of cap 108 fits into slot 200 of upper housing 10 providing an interference fit such that upper housing 10 cannot be slideably detached from lower housing 32 by disengaging bayonet tabs 40 from compound slots 41. Thus, torsion spring 180 provides an alternate means for generating the clamping pressure between the display pocket clip and pager housing 52. Although a torsion spring is preferred, other well known springs or resilient materials may also suitable for generating the clamping pressure. The optional integral switch can also be used with the torsion spring embodiment of the invention.

To assemble the torsion spring embodiment, ends 182 of spring 180 are inserted into holes 184 in the sides of lower housing part 32. Lower housing part 32 is then placed on top of pager housing 52 such that loop 186 in spring 180 surrounds collar 64 of nut 62 and pin 190 is inserted in slot 192. Screw 70 with washer 188 is then threaded into collar 64, thereby securing loop 186 to the upper surface of pager housing 52. Next, upper housing part 10 with internal parts assembled is slideably attached to lower housing part 32 using tabs 40 and compound slots 41, then cap 108 is snapped in place completing the assembly.

We claim:

1. A personal display pager, suitable for attachment to an article of clothing, said display pager comprising in combination:

a housing;

receiving means, located in said housing, for receiving information transmitted to said display pager;

a clip having first and second ends, said clip being attached to said housing at said first end of said clip, said clip having clamping means for clamping said article of clothing when said article of clothing is inserted between said housing and said clip, thereby removably attaching said display pager to said article of clothing;

a message display, located in said clip, for displaying visual messages corresponding to said information transmitted to said display pager; and means for electrically connecting said message display to said receiving means.

2. The display pager of claim 1, wherein said clamping means includes:

a pawl, pivotally attached to said clip at said second end of said clip; and at least one spring connected between said pawl and said clip.

3. The display pager of claim 2, further comprising:

a circuit substrate located in said clip;

a switch contact connected to said circuit substrate; and a switch button, movably attached to said clip, whereby, depressing said switch button causes said switch contact to contact said clip.

4. The display pager of claim 3, wherein:

said clip includes first and second parts, said first part has a plurality of interlocking slots and said second part has a plurality of interlocking tabs, whereby said first and second parts are connected when said interlocking tabs are engaged in said interlocking slots; and said circuit substrate includes display decoder/driver circuitry, said circuit substrate being electrically connected between said message display and said receiving means.

5. The display pager of claim 2, wherein said clip includes first and second parts, said first part has a plurality of interlocking slots and said second part has a plurality of interlocking tabs, whereby said first and second parts are connected when said interlocking tabs are engaged in said interlocking slots.

6. The display pager of claim 2, further comprising a circuit substrate, said circuit substrate having display decoder/driver circuitry, said circuit substrate being electrically connected between said message display and said receiving means.

7. The display pager of claim 1, further comprising:

a circuit substrate located in said clip;

a switch contact connected to said circuit substrate; and a switch button, movably attached to said clip, whereby, depressing said switch button causes said switch contact to contact said clip.

8. The display pager of claim 7, wherein said clip includes first and second parts, said first part has a plurality of interlocking slots and said second part has a plurality of interlocking tabs, whereby said first and second parts are connected when said interlocking tabs are engaged in said interlocking slots.

9. The display pager of claim 7, wherein said circuit substrate includes display decoder/driver circuitry, said circuit substrate being electrically connected between said message display and said receiving means.

10. The display pager of claim 1, wherein said clip includes first and second parts, wherein said first part has a plurality of interlocking slots and said second part has a plurality of interlocking tabs, whereby said first and second parts are connected when said interlocking tabs are engaged in said interlocking slots.

11. The display pager of claim 10, further comprising a circuit substrate, said circuit substrate having display decoder/driver circuitry, said circuit substrate being electrically connected between said message display and said receiving means.

12. The display pager of claim 1, further comprising a circuit substrate, said circuit substrate having display decoder/driver circuitry, said circuit substrate being electrically connected between said message display and said receiving means.

13. A display pocket clip, suitable for removably attaching a main housing having circuits to a personal article, said display clip comprising in combination:

a clip housing;

a message display located in said clip housing;

a circuit substrate located in said clip housing, said circuit substrate having display decoder/driver circuitry;

first electrical interconnecting means for electrically connecting said circuit substrate to said message display;

attaching means for attaching said clip housing to said main housing;

second electrical interconnecting means for electrically connecting said circuit substrate to said main housing circuits; and clamping means for clamping said personal article when said article is inserted between said main housing and said clip housing.

14. The display clip of claim 13, wherein said clamping means includes:

a pawl, pivotally attached to said display clip; and spring means for forcing said pawl against said personal article when said article is inserted between said display clip and said main housing.

15. The display clip of claim 14, wherein said clip housing includes first and second housing parts and means for interlocking said first and second housing parts.

16. The display clip of claim 15, wherein said display clip further includes an electrical switch.

17. The display clip of claim 14, further comprising:

a switch contact located in said clip housing, said contact having first and second positions; and a switch button positioned adjacent said switch contact, said switch button having first and second positions, whereby said contact is moved from said first to said second contact position when said switch button is moved from said first to said second button position.

18. The display clip of claim 13, wherein said clip housing includes first and second housing parts, said first housing part having a plurality of interlocking slots and said second part has a plurality of interlocking tabs for engaging said interlocking slots.

19. The display clip of claim 18, further comprising:

a switch contact located in said clip housing, said contact having first and second positions; and a switch button positioned adjacent said switch contact, said switch button having first and second positions, whereby said contact is moved from said first to said second contact position when said switch button is moved from said first to said second button position.

20. The display clip of claim 13, further comprising:

first and second proximate switch contacts, said first switch contact electrically connected to said circuit substrate; and a switch button adjacent said first switch contact and movably connected to said clip housing, said switch button having first and second positions, whereby moving said switch button from said first to said second position causes said first switch contact to electrically contact said second switch contact.

21. A display pocket clip, suitable for removably attaching a main housing having circuits to a personal article, said display clip comprising in combination:

a clip housing having first and second ends;

a message display located in said clip housing;

a circuit substrate located in said clip housing, said circuit substrate having display decoder/driver circuitry;

first electrical interconnecting means for electrically connecting said circuit substrate to said message display;

pivotal attaching means for pivotally attaching said clip housing to said main housing at said first end of said clip housing;

second electrical interconnecting means for electrically connecting said circuit substrate to said main housing circuits; and clamping means for generating a clamping pressure between said main housing and said clip housing at said second end of said clip housing.

22. The display clip of claim 21, wherein said clamping means includes:

a torsion spring having first and second attachment points, said first point attached to said display clip and said second point attached to said main housing.

23. The display clip of claim 22, wherein said clip housing includes first and second housing parts and means for interlocking said first and second housing parts.

24. The display clip of claim 23, wherein said display clip further includes an electrical switch.

25. The display clip of claim 22, further comprising:

a switch contact located in said clip housing, said contact having first and second positions; and a switch button positioned adjacent said switch contact, said switch button having first and second positions, whereby said contact is moved from said first to said second contact position when said switch button is moved from said first to said second button position.

26. The display clip of claim 21, wherein said clip housing includes first and second housing parts, said first housing part having a plurality of interlocking slots and said second part has a plurality of interlocking tabs for engaging said interlocking slots.

27. The display clip of claim 26, further comprising:

a switch contact located in said clip housing, said contact having first and second positions; and a switch button positioned adjacent said switch contact, said switch button having first and second positions, whereby said contact is moved from said first to said second contact position when said switch button is moved from said first to said second button position.

28. The display clip of claim 21, further comprising:

first and second proximate switch contacts, said first switch contact electrically connected to said circuit substrate; and a switch button adjacent said first switch contact and movably connected to said clip housing, said switch button having first and second positions, whereby moving said switch button from said first to said second positions causes said first switch contact to electrically contact said second switch contact.

* * * * *